United States Patent

Calsson et al.

Patent Number: 5,480,618
Date of Patent: Jan. 2, 1996

[54] GAS GENERATOR ARRANGEMENT

[75] Inventors: Staffan Calsson; Torsten Persson, both of Karlskoga, Sweden

[73] Assignee: Autoliv Development AB, Vårgårda, Sweden

[21] Appl. No.: 204,161

[22] PCT Filed: Jul. 6, 1993

[86] PCT No.: PCT/SE93/00613

§ 371 Date: Apr. 13, 1994

§ 102(e) Date: Apr. 13, 1994

[87] PCT Pub. No.: WO94/01307

PCT Pub. Date: Jan. 20, 1994

[30] Foreign Application Priority Data

Jul. 6, 1992 [SE] Sweden ................... 9202078

[51] Int. Cl.⁶ .................................................. B60R 21/16
[52] U.S. Cl. ........................ 422/164; 422/165; 422/166; 280/734
[58] Field of Search .................... 422/305, 164, 422/165, 166; 280/734, 735, 741; 102/530, 531

[56] References Cited

U.S. PATENT DOCUMENTS

| | | | |
|---|---|---|---|
| 2,529,791 | 11/1950 | Whitworth et al. | 102/531 |
| 3,733,180 | 5/1973 | Heineck et al. | 280/741 |
| 3,815,703 | 6/1974 | De Lorean et al. | 280/734 X |
| 3,862,669 | 1/1975 | Lindbert et al. | 280/734 |
| 4,249,673 | 2/1981 | Katoh et al. | 102/530 X |
| 4,561,675 | 12/1985 | Adams et al. | 280/734 |
| 4,593,622 | 6/1986 | Fibranz | 102/530 |
| 4,976,794 | 12/1990 | Biddle et al. | 149/19.5 |

*Primary Examiner*—Timothy M. McMahon
*Attorney, Agent, or Firm*—Spencer, Frank & Schneider

[57] ABSTRACT

A gas generator apparatus for generating gas for inflating a motor vehicle airbag comprises an ignition device including a first housing and a first pyrotechnic charge disposed in the first housing; a gas generator including a second housing having an opening, a sealing membrane covering the opening for hermetically sealing the second housing and being located adjacent to the first pyrotechnic charge in the first housing, a second pyrotechnic charge located in the second housing adjacent to the membrane, and a gas generating pyrotechnic material arranged in the second housing to be responsive to a combustion of the second pyrotechnic charge, wherein a combustion of the first pyrotechnic charge initiates a combustion of the second pyrotechnic charge through the membrane which in turn initiates combustion of the gas generating pyrotechnic material.

21 Claims, 1 Drawing Sheet

GAS GENERATOR ARRANGEMENT

BACKGROUND OF THE INVENTION

1. Field of the Invention

The present invention relates to a gas generator arrangement and more particularly relates to a gas generator arrangement adapted to generate gas to inflate an air bag.

It has been proposed to provide an air bag in a motor vehicle, the air bag being adapted to be inflated in the event that an accident should arise, the inflated bag providing protection for the driver of the vehicle or a passenger in the vehicle.

It is a requirement for an air bag in a motor vehicle that the air bag should operate quickly in the event that an accident arises. Thus, the air bag must be fully inflated within a very brief period of time if the air bag is to provide protection in a satisfactory manner. Also, the air bag must be very reliable. In some cases, the air bag has totally replaced safety belts, and it is thus imperative that the air bag should be inflated whenever an accident arises. A further factor that must be taken into account when designing an air bag arrangement is that the air bag may remain un-operated for a very long period of time, but must operate reliably whenever an accident occurs. Thus, a motor vehicle incorporating an air bag may be driven for twenty years or more, and the air bag must remain in an operative state for the whole of that period of time.

2. Description of the Related Art

In many prior proposed air bag arrangements, the air bag is associated with a crash sensor which consists of an electronic unit which, when subjected to a predetermined deceleration, indicative that an accident is occurring, transmits an electrical signal to an electrical ignite, present in the gas generator associated with the air bag.

However, it has now been proposed, as disclosed for example in WO 93/07440, to generate an ignition pulse not by using an electrical system, but instead by using a pyrotechnic trigger unit, which can generate an ignition pulse which is transmitted by means of a shock tube (such as the shock tube sold under the Trade Mark NONEL) to the gas generator of an air bag. Such a system is therefore independent of electrical power.

From the point of view of stability, it is important for the elements of such a system to be hermetically sealed or substantially leak-tight so that the elements can be stored and handled without any problems arising due to the ingress of moisture. It is also important for the gas generating substances within the gas generator to be ignited correctly to avoid an undesirable pressure rise curve.

The present invention seeks to provide an improved ignition device for use with a gas generator.

SUMMARY OF THE INVENTION

The above object is satisfied by the present invention, which concerns a gas generator apparatus for generating gas for inflating a motor vehicle airbag. The gas generator apparatus comprises an ignition device including a first housing and a first pyrotechnic charge disposed in the first housing; a gas generator including a second housing having an opening, a sealing membrane covering the opening for hermetically sealing the second housing and being located adjacent to the first pyrotechnic charge in the first housing, a second pyrotechnic charge located in the second housing adjacent to the membrane, and a gas generating pyrotechnic material arranged in the second housing to be responsive to a combustion of the second pyrotechnic charge, wherein a combustion of the first pyrotechnic charge initiates a combustion of the second pyrotechnic charge through the membrane which in turn initiates combustion of the gas generating pyrotechnic material.

Whilst the charge located adjacent the membrane may be the main charge of gas generating pyrotechnic material, it is preferably, a relay charge. Thus during operation of the device, is initially activated, and the relay charge, in turn, ignites the gas generating pyrotechnic material.

Preferably, the ignition device is associated with at least one shock tube, the arrangement being such that a shock pulse present on the shock tube will initiate the pyrotechnic charge within the ignition device. Conveniently, the ignition device is associated with two or more shock tubes. Preferably, each shock tube is associated with a non-return valve mechanism to prevent a shock transmitted to the ignition device by one shock tube being transferred to another of the shock tubes. Preferably, the ignition device comprises a housing defining a chamber receiving the pyrotechnic charge, the chamber being sealed by means of a membrane which is located adjacent the gas generator. Advantageously, the membrane is a metal or plastic foil.

Preferably, the receptor charge in the gas generator is associated with a flame guide adapted to direct the flame from the receptor charge to a gas generating pyrotechnic material.

Advantageously, the flame guide substantially tubular wall provided with apertures or openings therein separating a path for the flame from a region containing the pyrotechnic material.

In one embodiment, the flame guide is in the form of an elongate tube.

Preferably, a repeater pyrotechnic charge is provided at the free end of the elongate tube.

In an alternative embodiment, the flame guide is defined between a wall defining a bore within the housing and a bell-shaped element located within the bore.

Conveniently, the bell-shaped element is adapted to move, in response to ignition of gas generated pyrotechnic material contained within the bell-shaped element, to seal one end of the bore. Advantageously, the gas generator housing is provided with one or more outlet ports for gas generated by combustion of the pyrotechnic material. Preferably, each outlet port is initially sealed by means of a detonation plate adapted to burst at a predetermined pressure.

Preferably, each outlet port comprises an erodible nozzle whose opening area will change due to erosion during the combustion process.

Conveniently, the gas generating pyrotechnic material comprises NC gunpowder, Na acid, TAGN (triaminoguanadine nitrate) or LOVA gun powder (low vulnerability ammunition gun powder). Advantageously, the gas generating pyrotechnic material comprises one or more tablets or pills, loose granules, or grains, flakes or perforated bodies.

BRIEF DESCRIPTION OF THE DRAWINGS

In order that the invention may be more readily understood and so that further features thereof may be appreciated, the invention will now be described, by way of example, with reference to the accompanying drawings in which.

DETAILED DESCRIPTION OF THE PREFERRED EMBODIMENTS

Figure 1:
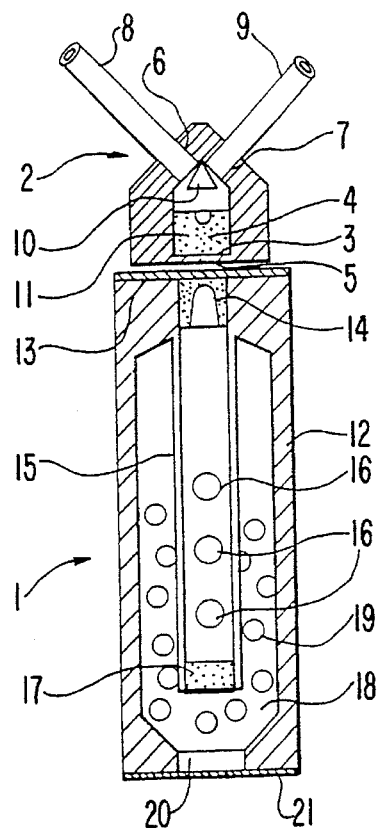
FIG. 1 is a cross-sectional view of one embodiment of a gas generator and an associated ignition device.

Referring initially to FIG. 1, a gas generator 1 is illustrated, associated with an ignition device 2. The ignition device 2 comprises a housing 3 defining a central chamber or cavity 4 sealed by means of a diaphragm 5 formed of a foil of plastic or metal.

The housing 3 defines two inlet bores 6,7 each of which receives the terminal portion of a respective hollow shock tube 8,9. Each shock tube may be of the type sold under the Trade Mark "NONEL". Associated with the termination of each shock tube is a non-return valve 10 located within the chamber 4. The non-return valve may comprise a spring biased flap associated with each shock tube 8,9 or may comprise a conical member pivotally mounted presenting flat faces adapted to abut either the end of the shock tube 8 or the end of the shock tube 9.

Contained within the cavity 4 is a pyrotechnic triggering charge 11.

The gas generator comprises a generally cylindrical housing 12 having a substantially hollow interior. The end of the housing 12 adjacent the membrane 5 is sealed by a membrane 13 which may be of metal or plastic. Located within the housing 12 immediately adjacent the membrane 13 is a relay pyrotechnic charge 14. The pyrotechnic charge 14 is mounted at one end of a tube 15 which extends axially of the housing 12, the tube 15 being provided with a plurality of apertures 16 formed in the side wall of the tube. The exterior of the tube 15 defines a flame guide. A further or repeater pyrotechnic charge 17 is provided at the end of the tube 15 remote from the charge 14.

The housing 12 defines a cavity 18 which surrounds the tube 15. The cavity 18 contains a gas producing pyrotechnic material 19. This may consist of NC gun powder, Na acid, TAGN (triaminoguanadine nitrate) or LODA gun powder (low vulnerability ammunition gun powder). The pyrotechnic material may be in the form of pills or tablets, loose granules, grains, flakes or perforated bodies.

The cavity 18 is adapted to communicate with the exterior of the housing 12 through an outlet port or nozzle 20 which is initially sealed by means of a detonation plate 21 which may be made of metal or plastic.

The outlet nozzle 20 may comprise an erodible nozzle adapted to change its opening area during the combustion process of the gas producing pyrotechnic material.

It is to be noted that the gas generator 1 is totally hermetically sealed, and the ignition device 2 is also hermetically sealed.

It is envisaged that the shock tubes 8 and 9 will be connected to crash sensors each adapted to generate a shock pulse within the respective shock tube in response to the occurrence of an accident. When a shock pulse is present on one of the shock tubes, (for example, the shock tube 8) the shock will travel along the shock tube and emerge from the end of the shock tube into the chamber 4. The shock will serve to actuate the non-return valve mechanism 10 in such a way that the shock can pass from the shock tube 8 into the cavity 4 whilst sealing the end of the shock tube 9, thus preventing any shock from travelling along the shock tube 9.

The shock entering the cavity 4 will ignite the pyrotechnic relay charge 11 which will rupture the membrane 5. The shock will cross the small gap between the membrane 5 and the membrane 13, and will penetrate the membrane 13 to activate the relay pyrotechnic charge 14. The shock wave or flame from the pyrotechnic charge 14 will travel down the tube 15, passing through the apertures 16 to ignite the pyrotechnic material 19. The number and position of the aperture position 16 is selected so that the gas generating pyrotechnic material 19 is "over ignited". That is to say, the pyrotechnic material 19 is thoroughly ignited at a number of different points, to ensure that the pressure of gas generated does not display undesirable pressure peaks and to ensure controlled burning. Such controlled burning must be such as to prevent unburnt pyrotechnic material being ejected from the gas generator, since if unburnt material is ejected, this could lead to a situation where the material is later ignited and burns holes in the airbags which is being inflated. Also the gas generating pyrotechnic material is "over ignited" to obviate any risk of the combustion process ceasing when the detonation plate 21 bursts, as will be described below.

When the pressure generated by the combustion of the gas producing pyrotechnic material 19 reaches a predetermined limit, the detonation plate 21 bursts, and gas flows through the outlet nozzle 20. The outlet nozzle 20 is an erodible nozzle which, due to erosion, changes its opening area during the combustion process. Thus, the cross-sectional area of the nozzle enlarges as the combustion proceeds. This gives a desirable characteristic to the flow of gas, there being a low flow rate when the volume of the air bag being inflated is relatively low and a high flow rate when the volume of the air bag being inflated is larger.

Figure 2:
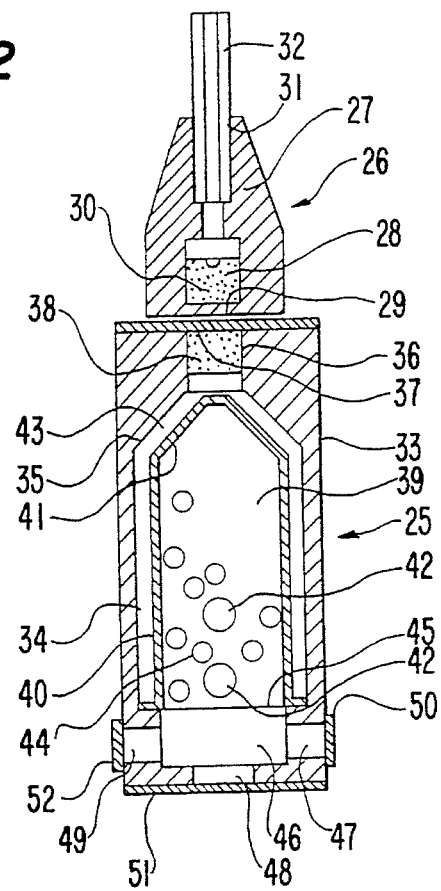
FIG. 2 is a cross-sectional view of an alternative form of a gas generator and ignition device.

FIG. 2 illustrates a second embodiment of the invention comprising a gas generator 25 and an ignition device 26. The ignition device 26 comprises a housing 27 defining a chamber 28 which is sealed by means of a membrane 29, the chamber containing a pyrotechnic charge 30. The housing 27 defines an inlet bore 31 which receives one end of a shock tube 32.

The gas generator 25 comprises a generally cylindrical housing 33 having an internal bore which defines a first portion 34 of relatively large diameter connected by a narrowing neck portion 35 to a terminal or bore portion 36 of a relatively small diameter, which extends to the end of the housing 33 adjacent the ignitior device 26. The end of the housing, and the end of the portion 36 of the bore of relatively small diameter, is sealed by means of a sealing membrane 37 which may be formed of metal or plastic. Contained within the bore portion 36 of relatively small diameter is a receptor pyrotechnic charge 38.

Contained within the first portion 34 of the bore is cup shaped element 39 having a generally cylindrical portion with a tubular wall 40 of a diameter slightly less than the diameter of the portion 34 of the bore, the cylindrical portion 40 terminating with a closure 41 of a shape corresponding to the shape of the inwardly directed neck 35. A plurality of apertures 42 are formed at appropriate positions in the tubular side wall defining the cylindrical portion 40 of the cup shaped element 39.

A channel 43 is defined between the cup 39 and the wall defining the bore 34, 35.

Contained within the cup is a pyrotechnic material 44 which may be the same as the pyrotechnic material of FIG. 1. The cup has a lower open end which is initially sealed by means of a membrane 45 which simply serves to retain the pyrotechnic material within the cup. The membrane 45 serves to separate the interior of the cup from a distribution plenum chamber 46 which is associated with three outlet ports 47, 48, and 49, the being closed by detonation plate 50, 51 and 52, respectively.

It is envisaged that when the embodiment of FIG. 2 is to be activated, a shock pulse will pass down the shock tube 32, into the chamber 28 and ignite the relay pyrotechnic charge 30. The membrane 29 will be ruptured and the shock pulse will pass through the membrane 37 to ignite the receptor pyrotechnic charge 38 within the portion 36 of relatively small diameter of the bore within the housing 33. The shock and/or flame from the receptor pyrotechnic charge 36 will flow down the passage 43 between the cup 39 and the inner wall of the bore, passing through the aperture 42 to thoroughly ignite (or "over ignite") the pyrotechnic material 44. The pressure generated will rupture the membrane 45 enabling the gas generated by the combustion of the gas generating pyrotechnic material 44 to enter to plenum chamber 46. The rise of pressure may cause cup 39 to move so that the closure 41 firmly abuts the portion of the bore within the housing 33 defining the narrowing neck 35, thus effectively sealing the upper end of the housing, in the orientation illustrated in FIG. 2. It is to be observed that the cylindrical portion 40 of the cup carries a terminal outwardly directed flange which slidingly engages the wall defining the portion 34 of the bore of greatest diameter so that the cup is guided to a good sealing position.

When the pressure in the plenum chamber 46 has been raised to a predetermined level, the detonation plates 50, 51 and 52 will break, thus permitting gas to escape from the gas generator to inflate the associated air bag.

The outlet ports 47, 48 and 49 may be erodible nozzles which, due to erosion change their effective cross-sectional area during the combustion process of the pyrotechnic material 44.

It is to be appreciated that the ignition devices as above include gas generators which may be totally hermetically sealed.

We claim:

1. A gas generator apparatus for generating gas for inflating a motor vehicle airbag, comprising:

an ignition device including a first housing, a first pyrotechnic charge disposed in said first housing, a plurality of shock tubes connected to said first housing and a non-return valve mechanism cooperating with each shock tube for preventing a shock transmitted to the first housing by one of the shock tubes from being transferred to another of the shock tubes;

a gas generator including a second housing having an opening, a sealing membrane covering the opening for hermetically sealing the second housing and being located adjacent to the first pyrotechnic charge in the first housing, a second pyrotechnic charge located in the second housing adjacent to said membrane, and a gas generating pyrotechnic material arranged in said second housing to be responsive to a combustion of the second pyrotechnic charge;

wherein a combustion of the first pyrotechnic charge initiates a combustion of the second pyrotechnic charge through said membrane which in turn initiates combustion of the gas generating pyrotechnic material.

2. An apparatus according to claim 1, wherein the gas generating pyrotechnic material comprises at least one of NC gunpowder, Na acid, triaminoguanadine nitrate and low vulnerability ammunition gun powder.

3. An apparatus according to claim 1, wherein the gas generating pyrotechnic material comprises at least one of tablets, pills, loose granules, grains, flakes, and perforated bodies.

4. An apparatus according to claim 1, wherein the first housing of the ignition device defines a chamber for receiving the first pyrotechnic charge, the chamber being sealed by a membrane located adjacent the gas generator.

5. An apparatus according to claim 4, wherein the membrane is a metal or plastic foil.

6. A gas generator apparatus for generating gas for inflating a motor vehicle airbag, comprising:

an ignition device including a first housing and a first pyrotechnic charge disposed in said first housing;

a gas generator including a second housing having an opening, a sealing membrane covering the opening for hermetically sealing the second housing and being located adjacent to the first pyrotechnic charge in the first housing, a second pyrotechnic charge located in the second housing adjacent to said membrane, a gas generating pyrotechnic material arranged in said second housing to be responsive to a combustion of the second pyrotechnic charge, and a flame guide located between the second pyrotechnic charge and the gas generating pyrotechnic material for directing the flame from the second pyrotechnic charge to the gas generating pyrotechnic material, said flame guide comprising a substantially tubular wall for separating a path for the flame from a region containing the gas generating pyrotechnic material, the substantially tubular wall having openings therein;

wherein a combustion of the first pyrotechnic charge initiates a combustion of the second pyrotechnic charge through said membrane which in turn initiates combustion of the gas generating pyrotechnic material.

7. An apparatus according to claim 6, wherein the flame guide is an elongate tube.

8. An apparatus according to claim 7, wherein a further pyrotechnic charge is provided at the free end of the elongate tube.

9. An apparatus according to claim 6, wherein the flame guide is defined between a wall defining an internal bore within the second housing and a bell-shaped element located within the internal bore.

10. The apparatus according to claim 9, and further including means for moving the bell-shaped element to seal one end of the internal bore in response to ignition of the gas generating pyrotechnic material.

11. The apparatus according to claim 10, wherein said means for moving includes means for containing the gas generating pyrotechnic material within the bell-shaped element.

12. An apparatus according to claim 6, wherein the gas generating pyrotechnic material comprises at least one of NC gunpowder, Na acid, triaminoguanadine nitrate and low vulnerability ammunition gun powder.

13. An apparatus according to claim 6, wherein the gas generating pyrotechnic material comprises at least one of tablets, pills, loose granules, grains, flakes, and perforated bodies.

14. An apparatus according to claim 6, wherein the first housing of the ignition device defines a chamber for receiving the first pyrotechnic charge, the chamber being sealed by a membrane located adjacent the gas generator.

15. An apparatus according to claim 14, wherein the membrane is a metal or plastic foil.

16. A gas generator apparatus for generating gas for inflating a motor vehicle airbag, comprising:

an ignition device including a first housing and a first pyrotechnic charge disposed in said first housing; and a gas generator including a second housing having an opening, a sealing membrane covering the opening for hermetically sealing the second housing and being located adjacent to the first pyrotechnic charge in the first housing a second pyrotechnic charge located in the second housing adjacent to said membrane, a gas generating pyrotechnic material arranged in said second housing to be responsive to a combustion of the second pyrotechnic charge, the second housing including at least one erodible outlet nozzle;

wherein a combustion of the first pyrotechnic charge initiates a combustion of the second pyrotechnic charge through said membrane which in turn initiates combustion of the gas generating pyrotechnic material, with gas generated by the combustion of the gas generating pyrotechnic material escaping through the at least one erodible outlet nozzle which, due to erosion, changes its opening area during the combustion process.

17. An apparatus according to claim 16, wherein the at least one outlet nozzle is sealed by a detonation plate which bursts at a predetermined pressure.

18. An apparatus according to claim 16, wherein the gas generating pyrotechnic material comprises at least one of NC gunpowder, Na acid, triaminoguanadine nitrate and low vulnerability ammunition gun powder.

19. An apparatus according to claim 16, wherein the gas generating pyrotechnic material comprises at least one of tablets, pills, loose granules, grains, flakes, and perforated bodies.

20. An apparatus according to claim 16, wherein the first housing of the ignition device defines a chamber for receiving the first pyrotechnic charge, the chamber being sealed by a membrane located adjacent the gas generator.

21. An apparatus according to claim 20, wherein the membrane is a metal or plastic foil.

* * * * *